United States Patent
Liu

(10) Patent No.: US 8,155,705 B2
(45) Date of Patent: Apr. 10, 2012

(54) DISPLAY SCREEN AND OPERATION OF SAME

(75) Inventor: Po-Yen Liu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 272 days.

(21) Appl. No.: 12/607,296

(22) Filed: Oct. 28, 2009

(65) Prior Publication Data

US 2011/0009106 A1    Jan. 13, 2011

(30) Foreign Application Priority Data

Jul. 10, 2009   (TW) ................................ 98123379 A

(51) Int. Cl.
*H04Q 7/32* (2006.01)

(52) U.S. Cl. .................. 455/566; 455/550.1; 455/567; 455/564; 455/90.3; 455/575.1; 379/373.01; 379/373.02; 379/373.03; 379/373.04; 379/374.01

(58) Field of Classification Search .............. 455/566, 455/550.1, 567, 564, 556.1, 556.2, 575.1, 455/412.1, 412.2, 90.3, 414.1–414.4, 418–420, 455/422.1; 379/373.01, 373.02, 373.03, 379/373.04, 374.03, 374.01, 375.01, 376.01
See application file for complete search history.

(56) References Cited

U.S. PATENT DOCUMENTS

| 6,418,330 | B1 * | 7/2002 | Lee ................................ 455/567 |
| 2003/0054864 | A1 * | 3/2003 | Mergler ......................... 455/566 |
| 2005/0217457 | A1 * | 10/2005 | Yamamoto et al. ......... 84/464 R |
| 2009/0221330 | A1 * | 9/2009 | Tomimori ..................... 455/566 |

* cited by examiner

*Primary Examiner* — Keith Ferguson
(74) *Attorney, Agent, or Firm* — Altis Law Group, Inc.

(57) ABSTRACT

A display screen comprises a receiving module, a control module electronically connected to the receiving module, a backlight drive module, and a backlight module. The receiving module is configured for receiving incoming calls and transmitting the incoming calls to the control module. The control module is configured for converting incoming calls to control signals and transmitting the control signals to the backlight drive module. The backlight module has different operation modes according to the incoming calls. One end of the backlight drive module is electronically connected to the control module, the other end of the backlight drive module is electronically connected to the backlight module. The backlight drive module is configured for driving the backlight module. A method of shining the display screen is also provided.

9 Claims, 1 Drawing Sheet

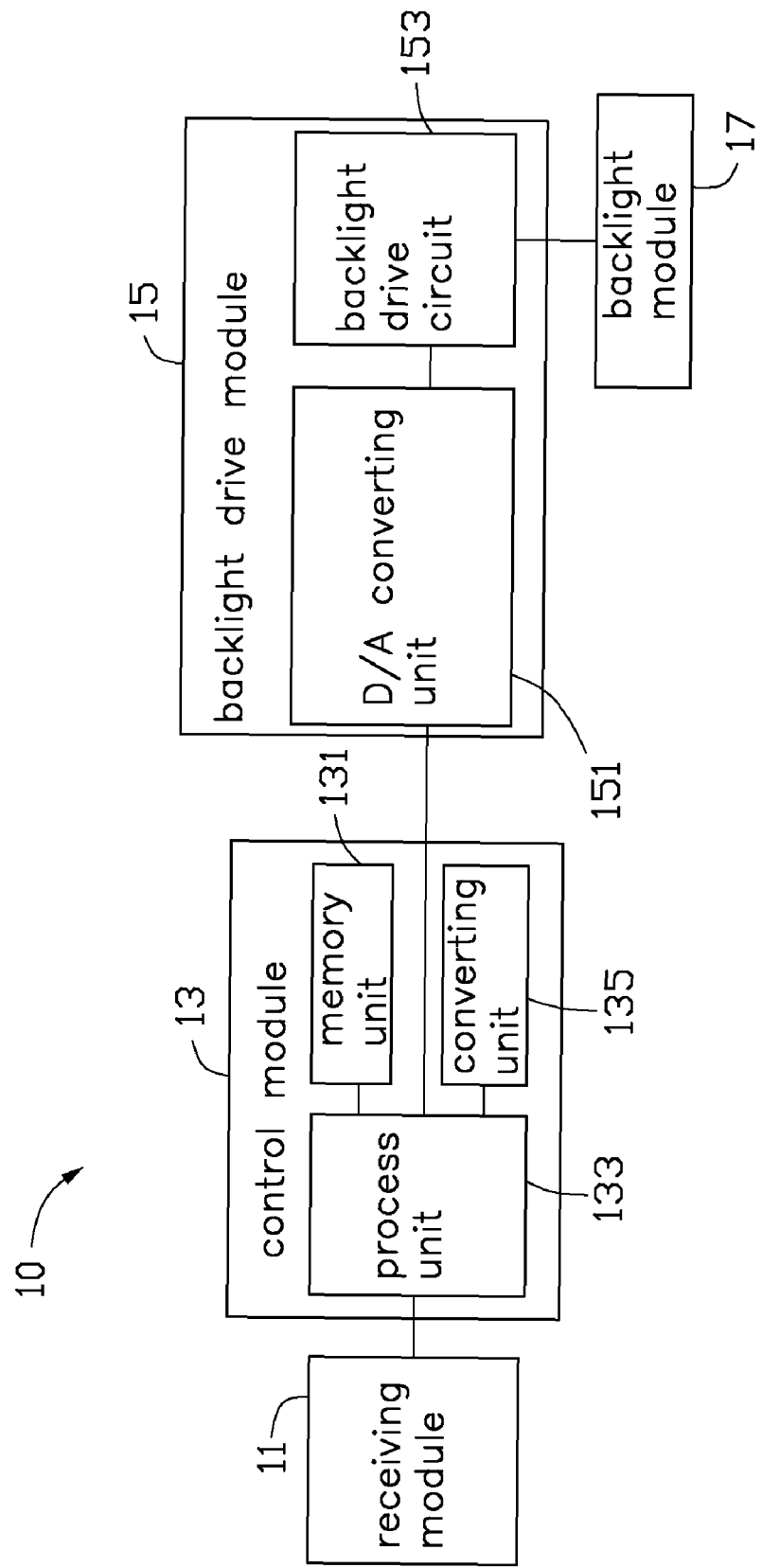

DISPLAY SCREEN AND OPERATION OF SAME

BACKGROUND

1. Technical Field

The present disclosure relates to display screens, particularly, to a display screen used in a portable electronic device.

2. Description of Related Art

Portable electronic devices, such as mobile phones and personal digital assistants (PDAs) are widely used. With development of technology, consumers desire high standard for display functions.

Typically, a mobile phone's screen has two operation modes, i.e., bright and dark. The bright mode is used to display signals, such as incoming calls. The dark mode is used when the mobile phone is in stand-by mode.

However, such operation modes are too limited to satisfy consumers. Therefore, there is room for improvement within the art.

BRIEF DESCRIPTION OF THE DRAWING

Many aspects of the display screen and operation of same can be better understood with reference to the following drawing. These drawing are not necessarily drawn to scale, the emphasis instead being placed upon clearly illustrating the principles of the present display screen and operation of same.

The FIGURE is a block diagram showing a display screen, in accordance with an exemplary embodiment.

DETAILED DESCRIPTION

The present display screen is used in a portable electronic device, such as a mobile phone or personal digital assistant (PDA).

FIG. 1 shows a block diagram of an exemplary display screen. The display screen 10 includes a receiving module 11, a control module 13, a backlight drive module 15, and a backlight module 17. The receiving module 11 is electronically connected to the control module 13. The backlight drive module 15 is electronically connected between the control module 13 and the backlight module 17.

The receiving module 11 receives wireless signals of incoming calls, processes the signals, e.g., filtering, amplifying and analog-to-digital converting the received wireless signals, and then transmits the processed wireless signals to the control module 13.

The control module 13 includes a memory unit 131, a process unit 133, and a converting unit 135. The memory unit 131 is used to store contact information including telephone numbers, ringtones and links of ringtones to corresponding contacts. The process unit 133 is used to determine whether the telephone number of an incoming call is stored in the memory unit 131 and whether the received telephone number has a link to a corresponding ringtone stored in the memory unit 131. If the received telephone number of an incoming call is not stored in the memory unit 131 or the received telephone number is not linked to a corresponding ringtone, the process unit 133 transmits a default ringtone to the converting unit 135. If the received telephone number of an incoming call is stored in the memory unit 131 and has a corresponding ringtone, i.e. a specific ringtone, in the memory unit 131, the process unit 133 transmits the corresponding ringtone to the converting unit 135. The converting unit 135 converts sound signals to backlight control signals used to control the backlight module 17 and transmits the backlight control signals to the backlight drive module 15.

The backlight drive module circuit 15 is a backlight drive module chip, and includes a digital-to-analog converting unit (D/A converting unit) 151 and a backlight drive module circuit 153. The D/A converting unit 151 is used to convert the control signals into the analog signals and then transmits the analog signals to the backlight drive module circuit 153, driving the backlight module 17 to activate the backlight module 17. The backlight drive module circuit 153 may be a current source circuit.

The backlight module 17 is electrically connected to the backlight drive module circuit 153, such that the backlight drive module 15 can control operation of the backlight module 17. The backlight module 17 includes "n" light emitting diodes (LEDs), thus having $2^n$ operation modes. In this embodiment, the backlight module 17 includes three LEDs, i.e., LEDA, LEDB, AND LEDC, and the backlight module 17 has 8 types of operation modes as follows ("1" represents "lit", and "0" represents "dark"):

1. [0,0,0] all dark
2. [1,0,0] LEDA lit, LEDB, and LEDC dark
3. [0,1,0] LEDB lit, LEDA, and LEDC dark
4. [0,0,1] LEDC lit, LEDA, and LEDB dark
5. [1,1,0] LEDA and LEDB lit, LEDC dark
6. [0,1,1] LEDA dark, LEDB and LEDC lit
7. [1,0,1] LEDA and LEDC lit, LEDB dark
8. [1,1,1] all lit An incoming call has a plurality of specific features, e.g., notes. The converting unit 135 can convert the notes of an incoming call into control signals corresponding to different operation modes. One note or several notes can correspond to different operation modes. For example, "0" (rest), "1" (do), "2" (re), "3" (mi), "4" (fa), "5" (so), "6" (la), and "7" (xi) each corresponds [0,0,0], [1,0,0], [0,1,0], [0,0,1], [1,1,0], [0,1,1], [1,0,1], and [1,1,1]. Therefore, the backlight module 17 can work in different operation modes according to the incoming call and e.g. flash.

When there is an incoming call, the receiving module 11 receives wireless signals of the incoming call, and then transmits the wireless signals to the control module 13. The control module 13 determines whether a telephone number included in the electronic signals has links to the stored contact information and ringtones, and generating backlight control signals corresponding to the determining result. If the received telephone number is not stored in the memory unit 131 or the received telephone number is not linked to a corresponding ringtone in the memory unit 131, the process unit 133 runs a default ringtone. If the received telephone number is stored in the memory unit 131 and the received telephone number has corresponding incoming ringtone previously set in the memory unit 131, the process unit 133 runs the corresponding incoming ring and transmits the incoming ring to the converting unit 135. The converting unit 135 converts sound signals of the incoming ring to backlight control signals and transmits the backlight control signals to the backlight drive module 15. Then the backlight drive module 15 transforms the backlight control signals to analog signals and transmits the analog signals to the backlight drive module circuit 153. Finally the backlight drive module circuit 153 drives the backlight module 17 to dynamically flash in a pattern corresponding to the incoming call.

The present display screen has a plurality of different operation modes and can be transformed among these operation modes according to an incoming call.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A display screen comprising:
 a receiving module receiving wireless signals of incoming calls and converting the wireless signals of incoming calls to electronic signals;
 a control module storing contact information, ringtones, and links of ringtones to contacts, the control module determining whether a telephone number included in the electronic signals has a link to the stored contact information and a corresponding ringtone, the control module generating backlight control signals corresponding to the determining result; and
 a backlight drive module receiving the backlight control signals and driving a backlight module to dynamically flash according to the backlight control signals; wherein the backlight drive module includes a digital to analog conversion unit and a backlight drive module circuit, the digital to analog conversion unit converts the backlight control signals into analog signals and then transmits the analog signals to the backlight drive module circuit to drive the backlight module.

2. The display screen as claimed in claim 1, wherein before transmitting the incoming calls to the control module, the receiving module processes the incoming calls.

3. The display screen as claimed in claim 1, wherein the control module includes a memory unit, a process unit, and a converting unit, the memory unit is used to store telephone numbers, the process unit is used to determine whether the received telephone number is stored in the memory unit and whether the received telephone number has a corresponding ring tone stored in the memory unit, if the received telephone number stored in the memory unit or the received telephone number does not have a corresponding ring tone in the memory unit, the process unit processes a default ring tone and transmits the default ring tone to the converting unit; if the received telephone number record is stored in the memory unit and the received telephone number has a corresponding ring tone stored in the memory unit, the process unit processes the corresponding ring tone and transmits the corresponding ring tone to the converting unit, the converting unit converts sound signals of the corresponding ring tone to control signals used to control the backlight module and transmits the control signals to the backlight drive module.

4. The display screen as claimed in claim 1, wherein the backlight drive module circuit is a current source circuit.

5. The display screen as claimed in claim 1, wherein the backlight module includes "n" light emitted diodes, thus having $2^n$ operation modes.

6. The display screen as claimed in claim 5, wherein notes of a ring tone corresponding to an incoming call correspond to the operation modes of the backlight modules.

7. A method of shining the display screen, comprising:
 providing a receiving module;
 receiving an incoming call with a telephone number using the receiving module;
 providing a control module;
 transmitting the telephone number to the control module, the control module comprising a memory unit, a process unit, and a converting unit;
 providing a backlight drive module circuit and a backlight module;
 determining whether the received telephone number is stored in the memory unit and whether the received telephone number has a corresponding incoming ring tone stored in the memory unit using the process unit;
 wherein if the received telephone number is not stored in the memory unit or the received telephone number does not have corresponding incoming ring tone stored in the memory unit, the process unit uses a default ring tone and transmits the default ring tone to the converting unit; if the received telephone number is stored in the memory unit and the received telephone number has corresponding incoming ring tone stored in the memory unit, the process unit runs the corresponding incoming ring tone and transmits the incoming ring tone to the converting unit;
 converting sound signals of the incoming ring tone or the default ring tone to control signals and transmits the control signals to the backlight drive module using the converting unit;
 driving the backlight module using the backlight drive module.

8. The display screen as claimed in claim 7, wherein the backlight module includes "n" light emitted diodes, thus having $2^n$ operation modes.

9. The display screen as claimed in claim 8, wherein notes of an incoming call correspond to the operation modes of the backlight modules.

* * * * *